(No Model.)
W. C. BUCHANAN
GRAIN SEPARATOR.
No. 372,452. Patented Nov. 1, 1887.
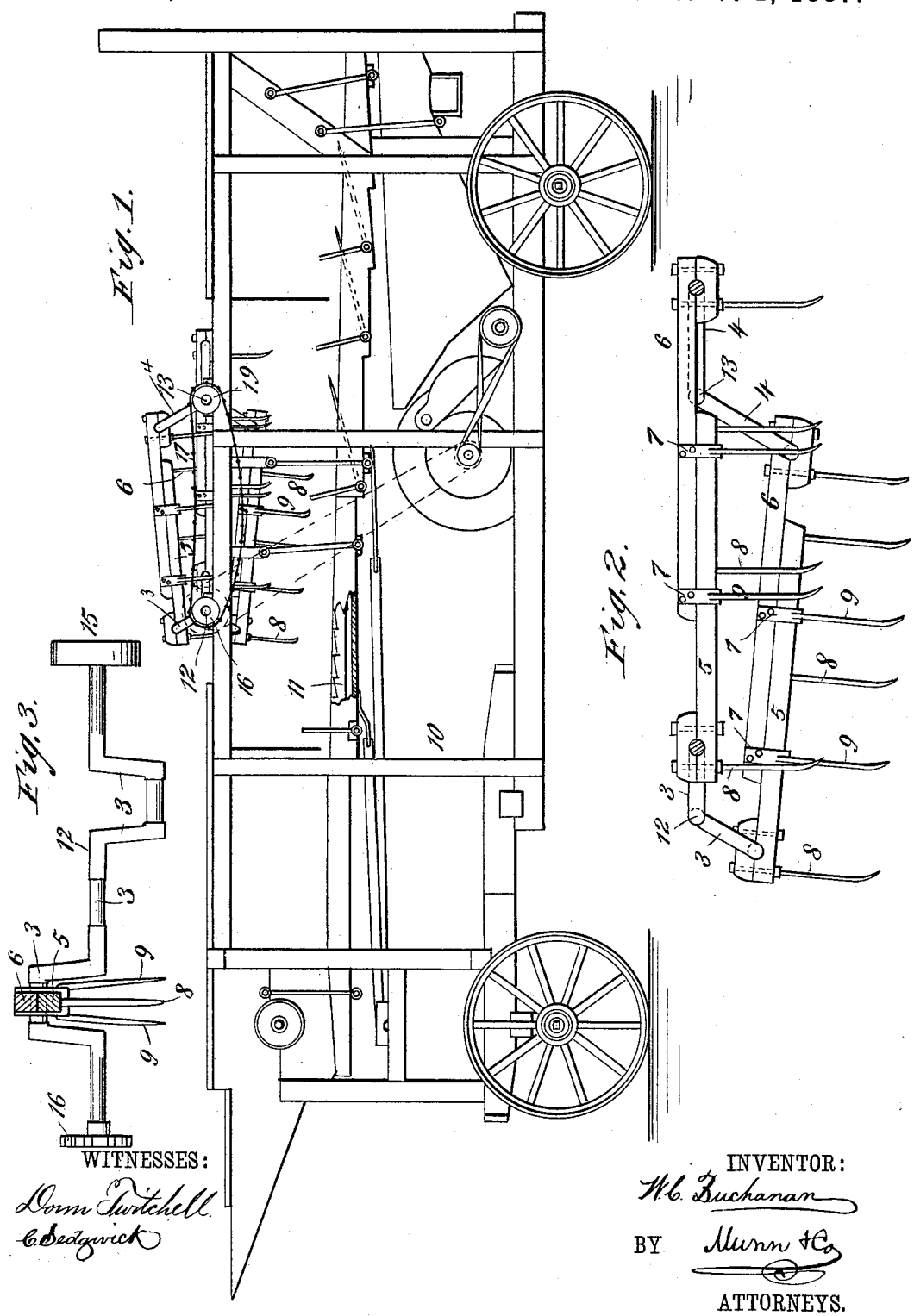
WITNESSES:
Dom Twitchell
C. Sedgwick
INVENTOR:
W. C. Buchanan
BY Munn & Co
ATTORNEYS.

UNITED STATES PATENT OFFICE.

WILLIAM C. BUCHANAN, OF BELLEVILLE, ILLINOIS, ASSIGNOR TO THE HARRISON MACHINE WORKS, OF SAME PLACE.

GRAIN-SEPARATOR.

SPECIFICATION forming part of Letters Patent No. 372,452, dated November 1, 1887.

Application filed March 22, 1887. Serial No. 231,923. (No model.)

*To all whom it may concern:*

Be it known that I, WILLIAM C. BUCHANAN, of Belleville, in the county of St. Clair and State of Illinois, have invented a new and Improved Grain-Separator, of which the following is a full, clear, and exact description.

This invention relates to grain-separators of the class illustrated, described, and claimed in Letters Patent No. 188,050, granted to applicant and Theophilus Harrison, the present invention consisting of a construction, whereby the rake or picker fingers are advanced at different rates of speed through paths of different length, so that the straw and grain acted upon are more fully torn apart and separated than they were with the construction illustrated in the patent above referred to.

Reference is to be had to the accompanying drawings, forming a part of this specification, in which similar figures of reference indicate corresponding parts in all the views.

Figure 1 is a side view of my improved form of grain-separator, parts being broken away. Fig. 2 is an enlarged detail view of the picking mechanism, one of the crank-arms of each shaft being shown in section; and Fig. 3 is a view of one of the crank-shafts, two of the pitmen being removed, while the other is shown in cross-section.

In the drawings above referred to, 10 represents the separator-frame, in which the reciprocating agitator-sections are mounted in the usual manner, the upper face of one of these agitator-sections being shown at 11. In connection with these agitator-sections I mount two crank-shafts, 12 and 13, the shaft 12 being provided with short crank-arms 3, while the shaft 13 is provided with long crank-arms 4. The crank-arms 3 carry pitman-sections 5, while the crank-arms 4 carry pitman-sections 6, the sections 5 and 6 overlapping, as indicated, the two sections being held together by straps 7, that are fixed to the section 6, and the said sections 5 passing freely through the said straps, so that when the crank-shafts are operated the sections 5 and 6 will slide one upon the other in opposite directions.

The sections 5 carry downwardly-extending picker or rake fingers 8, which are arranged beneath the central longitudinal line of said sections, while the sections 6 carry fingers 9, which extend downward from the sides of said sections, being preferably made integral with the straps 7. By thus arranging the fingers of the two sections they will be thrown out of line, and thereby be permitted to freely pass each other, as will be readily understood.

The crank-shaft 12 is provided with a pulley, 15, and is driven by means of a belt that receives its motion from any proper source of power. To the opposite end of the shaft 12 there is secured a sprocket-wheel, 16, over which there passes a belt or chain, 17, which serves to drive the shaft 13, through the medium of a chain or sprocket wheel, 19, that is carried by said shaft.

From the construction described it will be seen that as the shafts 12 and 13 are turned their pitman-sections 5 and 6 will travel unequal distances, and consequently as the fingers 8 and 9 are drawn through the straw they will act to tear or draw the straw apart, and thereby effectually dislodge the grain.

It will be noticed that the general construction of the separator above described and the separator illustrated in the patent above referred to is the same; but in the construction illustrated in this application the unequal travel of the fingers carried by the two sets of pitman sections serves so effectually to separate the straw that a decided advantage is obtained by the use of the construction forming the subject-matter of this application.

Having thus fully described my invention, I claim as new and desire to secure by Letters Patent—

1. The combination, with two crank-shafts, the arms of one shaft being longer than the arms of the other, of extensible pitmen formed of sections, sliding one upon the other and carrying fingers, said pitmen being connected to the crank-shafts, substantially as described.

2. The combination, with two shafts having crank-arms, the arms of one shaft being longer than the arms of the other shaft, of pitmen formed in sections, one section of each pitman being connected to a short crank-arm, while the other section of each pitman is connected to a long crank-arm, picker-fingers connected to the pitmen, and means for positively driving each crank-shaft, substantially as described.

3. The combination, with two crank-shafts, one having short and the other long crank-arms, and means for driving each shaft, of pitmen made in sections and connected to the crank-shafts, straps whereby they are held together and permitted to slide, the one upon the other, fingers extending downward from about the central line of the lower pitman-section, and fingers extending downward from the sides of the upper pitman section, substantially as set forth.

WILLIAM C. BUCHANAN.

Witnesses:
HENRY SPRING,
GEORGE A. HARVEY.